(12) United States Patent
Gesy

(10) Patent No.: US 10,793,117 B1
(45) Date of Patent: Oct. 6, 2020

(54) VEHICLE WASHING SYSTEM

(71) Applicant: Daniel L. Gesy, Sioux City, IA (US)

(72) Inventor: Daniel L. Gesy, Sioux City, IA (US)

( * ) Notice: Subject to any disclaimer, the term of this patent is extended or adjusted under 35 U.S.C. 154(b) by 77 days.

(21) Appl. No.: 16/294,166

(22) Filed: Mar. 6, 2019

(51) Int. Cl.
*B60S 3/06* (2006.01)
*B08B 1/00* (2006.01)
*B08B 3/02* (2006.01)
*B08B 1/04* (2006.01)

(52) U.S. Cl.
CPC .............. *B60S 3/063* (2013.01); *B08B 1/002* (2013.01); *B08B 1/008* (2013.01); *B08B 1/04* (2013.01); *B08B 3/024* (2013.01)

(58) Field of Classification Search
None
See application file for complete search history.

(56) References Cited

U.S. PATENT DOCUMENTS 3,688,784 A * 9/1972 Daum ...................... B60S 3/04
134/123
6,134,735 A 10/2000 Zamensky et al.

* cited by examiner

*Primary Examiner* — Michael E Barr
*Assistant Examiner* — Jason P Riggleman
(74) *Attorney, Agent, or Firm* — Dennis L. Thomte; Thomte Patent Law Office LLC

(57) ABSTRACT

A vehicle washing system which includes an elevated support rail structure which has a wash tool movably mounted thereon. The support rail structure includes a fixed forward rail section and a selectively movable rear rail section. The movable rear rail section is movable between a retracted position and an extended position with respect to the forward rail section so as to be able to wash long vehicles and short vehicles.

5 Claims, 4 Drawing Sheets

VEHICLE WASHING SYSTEM

BACKGROUND OF THE INVENTION

Field of the Invention

This invention relates to a vehicle washing system of the roll-over type. More particularly, this invention relates to a vehicle washing system which is able to wash short vehicles and long vehicles.

Description of the Related Art

Many different vehicle washing systems have been previously provided. Some vehicle washing systems are of the drive-through or tunnel wash type wherein the vehicle is pulled through the wash system while the vehicle is being washed and dried. Another type of vehicle washing system is of the roll-over type wherein the vehicle is driven into the wash area and then stopped. A water spray apparatus is then moved around the vehicle to wash the same if the system is of the "touch free" type. In another type of roll over vehicle washing system, the system employs rotatable bristle brushes or cloth pads and is known as a friction type system.

In the prior art systems, the wash tool, whether it be a spray apparatus or a friction type system, is movably supported on an overhead track or rail system having a forward end, first and second sides and a rearward end. The overhead rail systems of the prior art are designed to position the wash tool at the same distance from the vehicle as the wash tool moves around the vehicle. The problem with the prior art systems is that the wash tool will be spaced too far from the rear end of a short vehicle such as a Smart Car which may result in the rear end of the vehicle not being properly washed. Another problem associated with the prior art vehicle washing systems is that some of the vehicles, such as a pick-up truck, are too long for the washing system. If the system is designed to accommodate large vehicles, the rear ends of shorter vehicles will be positioned too far away from the wash tool thereby resulting in an improper washing of the rear end of the shorter vehicle.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A vehicle washing system is provided in a wash bay having a vehicle entrance end, a vehicle exit end, a first side, a second side, and a floor. The system includes an elevated and horizontally disposed support rail assembly, having rearward and forward ends, positioned in the wash bay and which is sufficiently spaced above the floor of the wash bay so a vehicle may be positioned below the support rail assembly.

The support rail assembly includes a generally U-shaped and fixed forward rail section having a forward end and a rearward end and a generally U-shaped and horizontally movable rearward rail section having a forward end and a rearward end. The forward end of the U-shaped rearward rail section is selectively movably secured to the rearward end of the U-shaped forward rail section. The U-shaped rearward rail section is selectively movable between a retracted position and an extended position with respect to the U-shaped forward rail section. A wash tool is movably mounted on the fixed forward rail section and the movable rearward rail section. The support rail assembly, when the rearward rail section is in the retracted position, enables the wash tool to closely move around a short vehicle to be washed. The support rail assembly, when the rearward rail section is in the extended position, enables the wash tool to closely move around a long vehicle to be washed. The wash tool may be of a friction type or of the spray bar type.

It is therefore a principal object of the invention to provide an improved vehicle washing system which will accommodate short vehicles and long vehicles.

A further object of the invention is to provide an improved vehicle washing system wherein the support rail thereof may be adjusted to wash short vehicles and long vehicles.

A further object of the invention is to provide a wash tool support structure which is quickly and easily adjusted to accommodate short and long vehicles.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
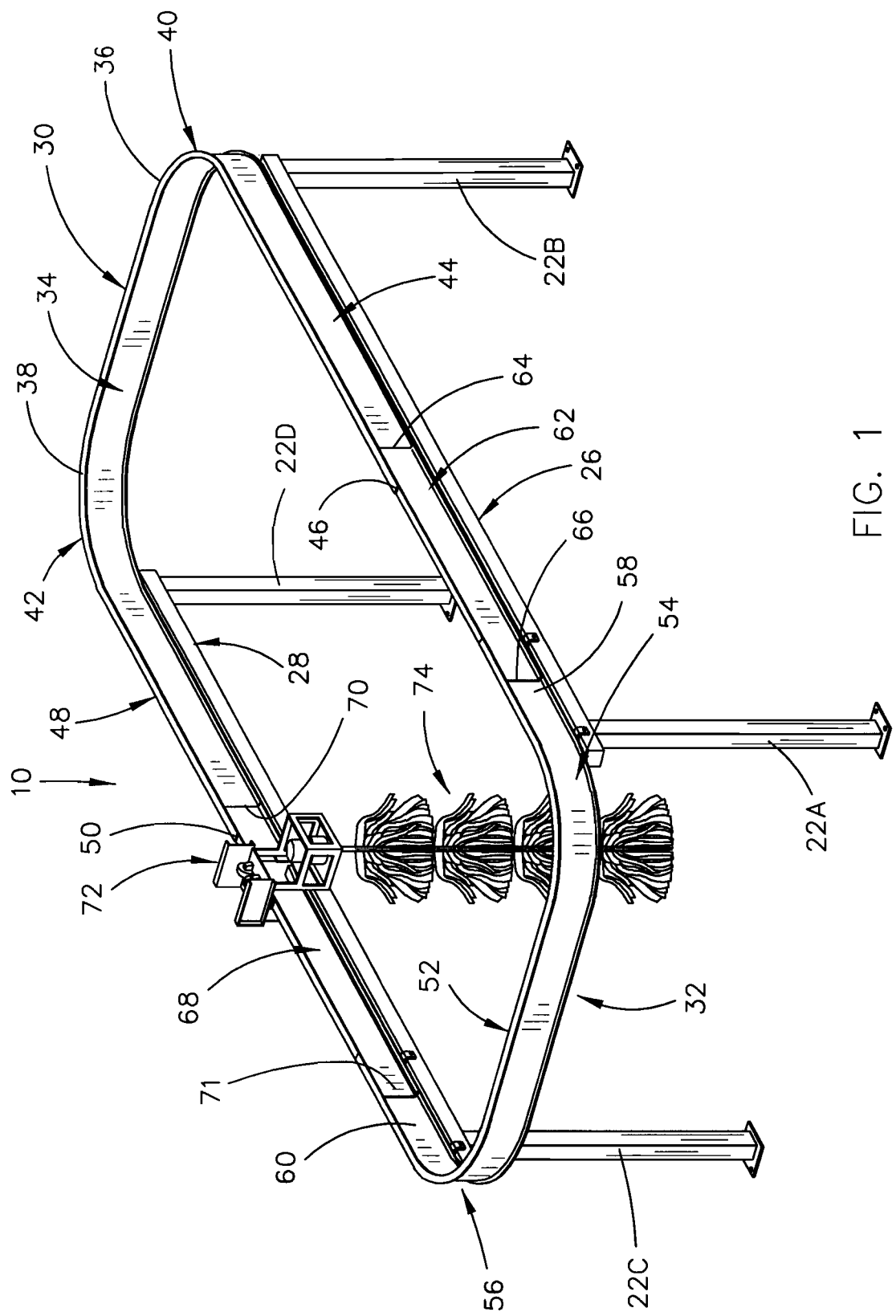
FIG. 1 is a perspective view of the vehicle washing system of this invention with the support rail thereof being in its extended position.
Figure 2:
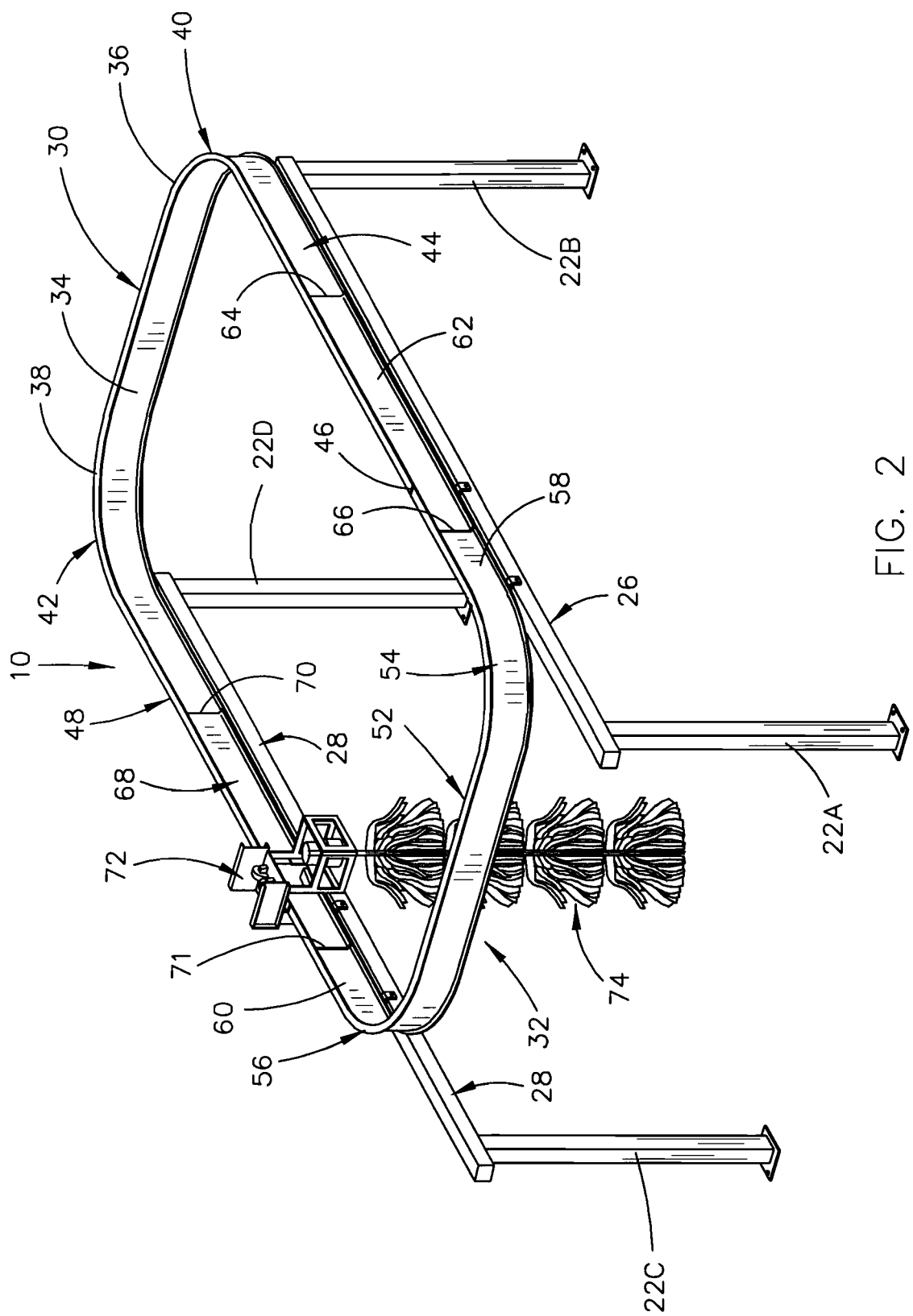
FIG. 2 is a perspective view of the vehicle washing system of this invention with the support rail thereof being in its retracted position.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The vehicle washing system of this invention is designated by the reference numeral 10. The system 10 will be usually located in a wash bay area 12 having a floor 14, an entrance end 16 and an exit end 18. The vehicle to be washed will normally be driven into the wash bay area 12 and stopped at a predetermined position within the system 10. The system 10 of this invention includes a horizontally disposed support rail structure 20 which is supported above the floor 14 at a height sufficient to permit vehicles to pass thereunder.

The support rail structure 20 is supported above the floor 14 by a plurality of vertically disposed posts 22A, 22B, 22C and 22D. A horizontally disposed support beam 26 extends between the upper ends of posts 22A and 22B. A horizontally disposed support beam 28 extends between the upper ends of posts 22C and 22D. The support beams 26 and 28 could be supported by the walls of the wash bay area or the ceiling of the wash bay area.

Support rail structure 20 includes a fixed forward support rail assembly 30 and a movable rearward support rail assembly 32. Forward support rail assembly 30 includes a straight rail member 34 having ends 36 and 38. Forward support rail assembly 30 also includes a curved rail member 40 which extends outwardly and rearwardly from end 36 of rail member 34. Forward support rail 30 also includes a curved rail member 42 which extends outwardly and rearwardly from end 38 of rail member 34. Forward support rail assembly 30 also includes a straight rail member 44 which extends rearwardly from curved rail member 40 and which has a rearward end 46. Forward support rail assembly 30 also includes a straight rail member 48 which extends rearwardly from curved rail member 42 and which has a rearward end 50.

The movable rearward support rail assembly 32 includes a straight rail member 52 having curved rail members 54 and 56 at its opposite ends which extend outwardly and forwardly therefrom. A straight rail member 58 extends forwardly from the curved rail member 54 and a straight rail member 60 extends forwardly from the curved rail member 56.

The numeral 62 refers to a C-channel assembly having a forward end 64 and a rearward end 66. The rearward end 66 of C-channel assembly 62 is secured to the forward end of straight rail member 58. The numeral 68 refers to a C-channel assembly having a forward end 70 and a rearward end 71. The rearward end 71 of C-channel assembly 68 is secured to the forward end of straight rail member 60. The structure of assemblies 62 and 68 are now described in detail.

C-channel assembly 62 includes elongated outer and inner C-channel members having forward and rearward ends. The rearward end of the outer C-channel member is positioned at the outer side of rail member 58 between the upper and lower flanges of rail member 58. The rearward end of the inner C-channel member is positioned at the inner side of rail member 58 between the upper and lower flanges of rail member 58. The rearward ends of the outer and inner C-channel members are secured to rail member 58 by bolts or the like. The forward ends of the outer C-channel member of C-channel assembly 62 is slidably received between the upper and lower flanges of rail member 44 at the outer side of rail member 44. The forward end of the inner C-channel member of C-channel assembly 62 is slidably received between the upper and lower flanges of rail member 44 at the inner side of rail member 44.

C-channel assembly 68 includes elongated outer and inner C-channel members having forward and rearward ends. The rearward end of the outer C-channel member is positioned at the outer side of rail member 60 between the upper and lower flanges of rail member 60. The rearward end of the inner C-channel member is positioned at the inner side of rail member 60 between the upper and lower flanges of rail member 60. The rearward ends of the outer and inner C-channel members are secured to rail member 60 by bolts or the like. The forward ends of the outer C-channel member of C-channel assembly 68 is slidably received between the upper and lower flanges of rail member 48 at the outer side of rail member 48. The forward end of the inner C-channel member of C-channel assembly 68 is slidably received between the upper and lower flanges of rail member 48 at the inner side of rail member 48.

The rearward support rail 32 may be manually moved between the extended position and the retracted position but is preferably movable by an electric gear motor or the like.

The numeral 72 refers to a conventional carriage or trolley which is movable along the support rail structure 20 in conventional fashion. A conventional wash tool 74 is mounted on the carriage 72 for movement therewith. The drawings illustrate that the wash tool 74 is of the rotating brush or friction type. However, the wash tool 74 may be of the spray bar type, the cloth type, etc.

Figure 3:
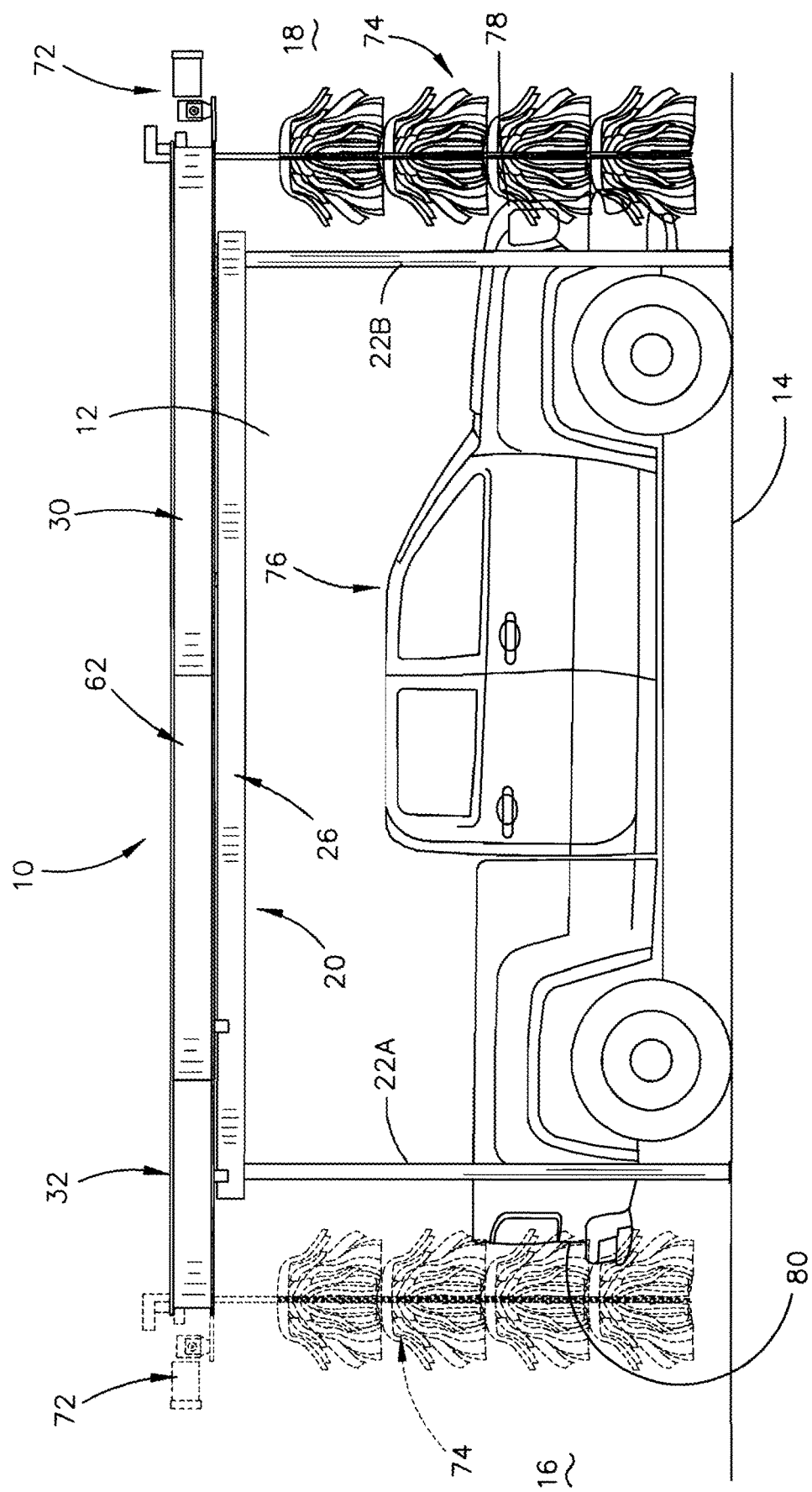
FIG. 3 is a side view of the vehicle washing system having the support rail thereof in its extended position to accommodate a longer pick-up truck.

FIG. 3 illustrates a long vehicle such as a pick-up truck 76 having a forward end 78 and a rearward end 80 positioned below the support rail structure 20. The movable rear rail assembly 32 has been positioned in its extended position so that the wash tool 74 may move around the entire vehicle 76 in close proximity thereto to wash the vehicle 76.

Figure 4:
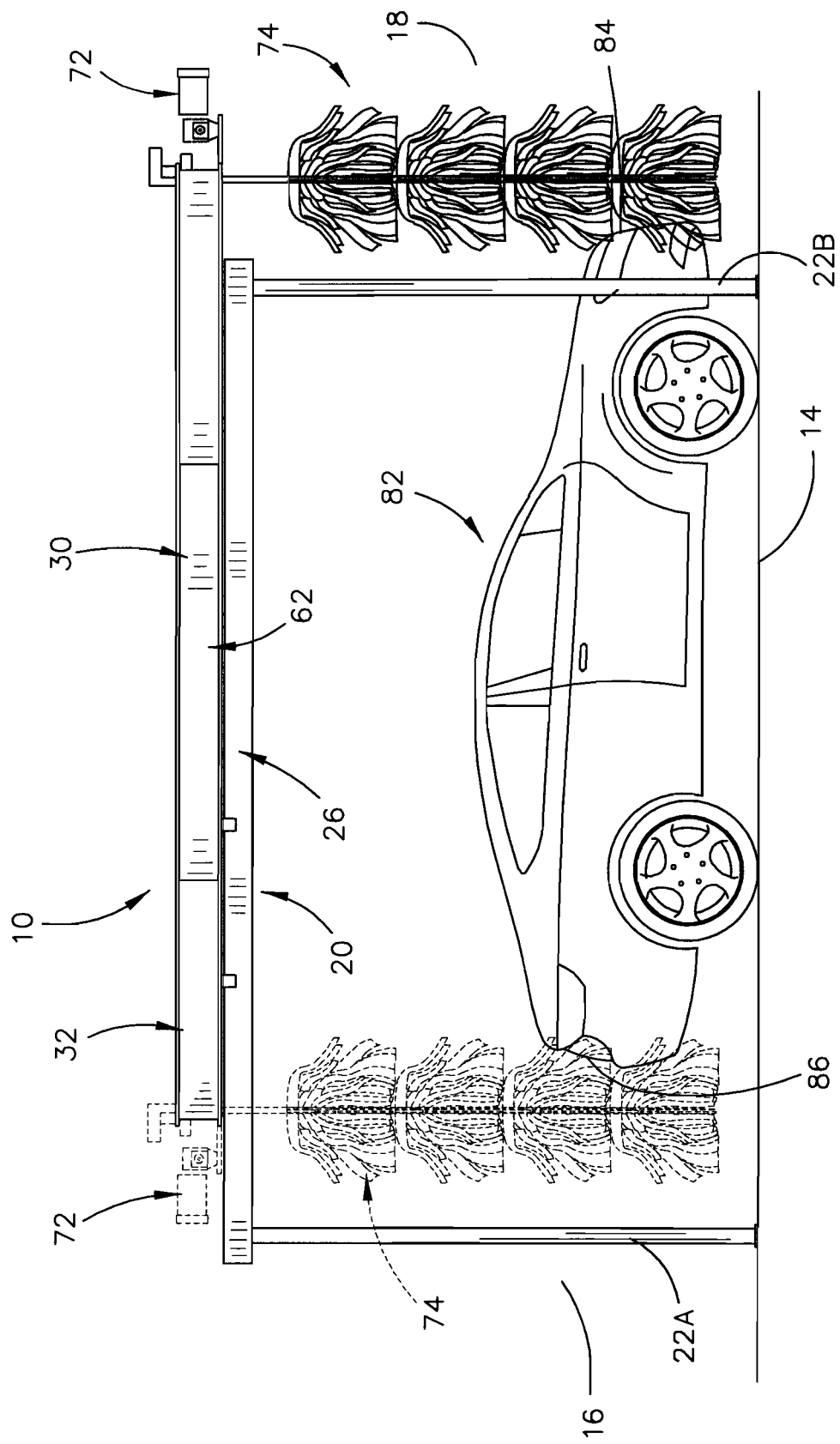
FIG. 4 is a side view of the vehicle washing system having the support rail thereof in its retracted position to accommodate a shorter vehicle.

FIG. 4 illustrates the rear rail assembly 32 in its retracted position so that the short vehicle 82, having a forward end 84 and a rearward end 86, will be washed. As seen in FIG. 4, the retraction of rear rail assembly 32 enables the wash tool 74 to be closely positioned to the rearward end 86 of the vehicle 82. If the rear rail assembly 32 could not be retracted, the wash tool 74 would be positioned some distance from the rearward end of the short vehicle 82 thereby resulting in a poor washing job of the rearward end 86 of the vehicle 82.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A vehicle washing system positioned in a wash bay having a vehicle entrance end, a vehicle exit end, a first side, a second side and a floor, comprising:
    an elevated and horizontally disposed support rail assembly, having rearward and forward ends, positioned in the wash bay and which is sufficiently spaced above the floor of the wash bay so that a vehicle may be positioned below said support rail assembly;
    said support rail assembly comprising:
        (a) a generally U-shaped and fixed forward rail section having a forward end and a rearward end;
        (b) a generally U-shaped and horizontally movable rearward rail section having a forward end and a rearward end;
        (c) said forward end of said rearward rail section being selectively movably secured to said rearward end of said forward rail section;
        (d) said rearward rail section being selectively movable between a retracted position and an extended position with respect to said forward rail section;
    a wash tool movably mounted on said fixed forward rail section and said movable rearward rail section;

said support rail assembly, when said rearward rail section is in said retracted position, enabling the wash tool to closely move around and a short vehicle to be washed; and said support rail assembly, when said rearward rail section is in said extended position, enabling the wash tool to closely move around a long vehicle to be washed.

2. The vehicle washing system of claim 1 wherein said wash tool is of the friction type.

3. The vehicle washing system of claim 1 wherein said wash tool is of the spray bar type.

4. The vehicle washing system of claim 1 wherein said fixed forward rail section includes:
  (a) a horizontally disposed and straight first rail member having first and second ends;
  (b) a horizontally disposed first curved rail member, having a rearward end, extending outwardly and rearwardly from said first end of said straight first rail member thereof;
  (c) a horizontally disposed second curved rail member, having a rearward end, extending outwardly and rearwardly from said second end of said straight first rail member thereof;
  (d) a horizontally disposed and straight second rail member, having forward and rearward ends, extending rearwardly from said rearward end of said first curved rail member of said fixed rail section;
  (e) a horizontally disposed and straight third rail member, having forward and rearward ends, extending rearwardly from said rearward end of said second curved rail member of said fixed rail section;

said movable U-shaped rail section including:
  (a) a horizontally disposed and straight first rail member having first and second ends;
  (b) a horizontally disposed first curved rail member, having a forward end, extending outwardly and forwardly from said first end of said straight first rail member thereof;
  (c) a horizontally disposed second curved rail member, having a forward end, extending outwardly and forwardly from said second end of said straight rail member thereof;
  (d) a horizontally disposed and straight second rail member, having rearward and forward ends, extending forwardly from said forward end of said first curved rail member thereof; and
  (e) a horizontally disposed and straight third rail member, having rearward and forward ends, extending forwardly from said forward end of said second curved rail member thereof;

a horizontally disposed first connector assembly, having forward and rearward ends;

said rearward end of said first connector assembly being secured to said forward end of said second rail member of said movable rearward rail section and having its forward end selectively movably secured to said rearward end of said straight second rail member of said fixed forward rail section;

a horizontally disposed second connector assembly having forward and rearward ends; and said rearward end of said second connector assembly being secured to said forward end of said third rail member of said movable rearward rail section and having its forward end selectively movably secured to said rearward end of said straight third rail member of said fixed forward rail section.

5. The vehicle washing system of claim 4 wherein each of said first and second connector assemblies comprise a C-channel assembly.

* * * * *